(12) United States Patent
Stoops

(10) Patent No.: US 7,722,067 B2
(45) Date of Patent: May 25, 2010

(54) VEHICLE RUNNING STEP

(76) Inventor: Jesse W. Stoops, 607 N. 4th St., Ozark, MO (US) 65721

( * ) Notice: Subject to any disclaimer, the term of this patent is extended or adjusted under 35 U.S.C. 154(b) by 492 days.

(21) Appl. No.: 11/529,047

(22) Filed: Sep. 28, 2006

(65) Prior Publication Data

US 2007/0075519 A1      Apr. 5, 2007

Related U.S. Application Data

(60) Provisional application No. 60/721,944, filed on Sep. 30, 2005.

(51) Int. Cl.
*B60R 3/00* (2006.01)
(52) U.S. Cl. ..................... 280/169; 280/164.1
(58) Field of Classification Search ................. 280/163, 280/166, 169, 164.1, 727, 164.2, 762, 770
See application file for complete search history.

(56) References Cited

U.S. PATENT DOCUMENTS

| | | | | |
|---|---|---|---|---|
| 1,271,979 A | * | 7/1918 | Wren | 280/169 |
| 2,981,554 A | * | 4/1961 | Mulder et al. | 280/164.1 |
| 4,004,800 A | * | 1/1977 | Hanner | 482/15 |
| 4,017,093 A | * | 4/1977 | Stecker, Sr. | 280/163 |
| 4,274,648 A | * | 6/1981 | Robins | 280/166 |
| D340,904 S | * | 11/1993 | Bevier | D12/203 |
| 6,173,979 B1 | * | 1/2001 | Bernard | 280/163 |
| 6,325,397 B1 | * | 12/2001 | Pascoe et al. | 280/166 |
| 6,581,946 B2 | | 6/2003 | Lund | |
| 6,726,230 B2 | | 4/2004 | Weir | |
| D494,914 S | | 8/2004 | Elwell | |
| 6,997,469 B2 | * | 2/2006 | Lanoue et al. | 280/163 |
| 2003/0011163 A1 | * | 1/2003 | Coomber et al. | 280/163 |
| 2003/0173357 A1 | * | 9/2003 | Lepine et al. | 220/4.01 |
| 2004/0150183 A1 | * | 8/2004 | Clermont et al. | 280/163 |
| 2006/0087094 A1 | * | 4/2006 | Byrne et al. | 280/166 |

* cited by examiner

*Primary Examiner*—Paul N Dickson
*Assistant Examiner*—John R Olszewski
(74) *Attorney, Agent, or Firm*—Lathrop & Gage LLP

(57) ABSTRACT

A vehicle running step formed of an elongate tube, the tube having an opening therethrough with a plurality of spaced apart tread plates mounted within the opening. The spaced apart tread plates form a non-slip self-cleaning step area along the tube. Dirt, debris, snow and ice can pass between the spaced apart tread plates to increase overall safety of the device. Furthermore, the spaced apart tread plates are aesthetically pleasing and relatively simple to manufacture.

12 Claims, 4 Drawing Sheets

VEHICLE RUNNING STEP

RELATED APPLICATIONS

This application claims the benefit of priority to U.S. application Ser. No. 60/721,944 filed Sep. 30, 2005, which is incorporated herein by reference.

BACKGROUND OF THE INVENTION

1. Field Of The Invention

This invention relates generally to the field of vehicle running steps and more particularly to a running step with self-cleaning, slip proof treads.

2. Description Of The Related Art

A variety of configurations of running steps have been designed and developed both as original equipment manufacture (OEM) products and as after market or add-on products. Running steps are not the same as running boards. Many running boards are molded from plastics and synthetic compounds or formed from metal. Common running boards include a tread and a mechanism for attaching the tread to the vehicle structure; generally the board is connected to the vehicle at one edge and along its entire length. Running steps are distinguishable in that the tread portion is generally spaced apart from the vehicle and connected to the vehicle at the opposed ends of the step.

Running steps usually have at least two attachment points which are fixed to the side rails of the vehicle chassis or which span underneath a chassis to attach to a vehicle rail. These steps are commonly manufactured from a tube where the tube has opposed ends, each end provided with attachment mechanisms for mounting to the vehicle chassis. The tread portion of the vehicle step is generally spaced apart from the vehicle chassis so that a space exist between the step and the body of the vehicle.

Because tube steps, often manufactured from chrome plated steel or aluminum can be slippery and somewhat dangerous when wet, covered with snow or mud, it is not uncommon to have a tread portion covered with rubber, abrasive paper or other slip-resistant material; In some applications, a slight recess or indention is formed in the upper most surface of the tube and a tread plate, formed of metal, rubber, plastic or other materials is positioned within the insert, substantially flush the upper tube surface. The insert is generally retained with adhesive, bolts, snaps, friction taps or similar fasteners. Vehicle sidesteps having tread inserts are disclosed at U.S. Pat. No. 6,581,946 to Lund, U.S. Pat. No. 6,726,230 to Weir, the Design Patent U.S. D494,914 issued to Elwell.

Each if these referenced patents disclose a tube step having a recess or insert in the upper surface with a tread plug inserted therein. The tread plugs are generally manufactured of rubber, plastic and in some cases metal. These tread plugs accumulate dirt, snow, ice and debris thereby posing a safety hazard to users. Further, the plugs utilizing rubber, plastic or abrasive papers are prone to wear and damage.

SUMMARY

The disclosed vehicle running step facilitates the disbursement or eradication of accumulated debris, and includes a stable, self-cleaning and non-slip tread insert thus overcoming the above described limitations of the prior art.

In one embodiment, a vehicle running step is formed from tube material, preferably manufactured from steel, aluminum or other suitable rigid material. The running step is provided with a linear step section interposing two curved end portions. The end portions both curve in one direction such that each end of the tube can be mounted to the chassis of the vehicle to which the step is attached. It will be obvious that a pair of vehicle running steps would include two opposed steps, one for each side of the vehicle. Generally, herein only one vehicle running step will be described with the understanding that the orientation must be reversed for positioning and fastening to the opposite side of the vehicle.

At a predetermined position along the length of the tube, an insert opening is formed by cutting away a portion of the tube, preferably spanning from the upper most surface completely through the lower most surface to form an opening completely through the tube body. An insert is manufactured and fixed within the opening. The insert includes a plurality of spaced apart, rigid plates in the upright or vertical position. This orientation provides a plurality of spaced apart plate edges in the tread position so that when the user steps on the insert, their foot spans the spaced apart plates. Because the insert opening traverses completely from the upper surface to the lower surface of the tube, any dirt, debris, ice, snow or other materials can fall between the plates onto the ground. Moreover, because it is common during vehicle operation for debris to accumulate on sidesteps, the spaced apart plate orientation facilitates self-cleaning of the tread as the debris falls between the spaced apart plates.

DETAILED DESCRIPTION

Figure 1:
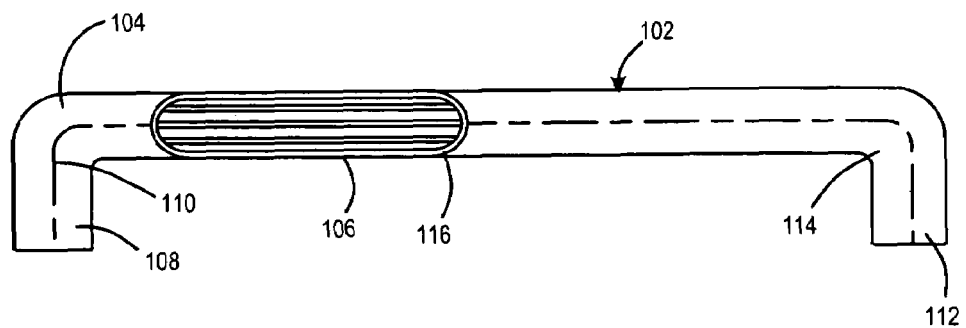
FIG. 1 is a top plan view of an embodiment of a vehicle running step.

Now referring generally to FIG. 1, a vehicle running step 102 is shown. The running step 102 is formed in any conventional manner, but is typically constructed of rigid tubular materials such as tubular steel which is then painted chrome plated. The step extends from beneath a vehicle where it is attached to a frame member, or similar rigid surface via brackets, or direct attachments, such as weldment or bolting. The step includes a tube 104 with a step portion 106. It is understood the tube may have any geometric cross-section such as round, oval, square or the like. The tube 104 also has a first end 108 and a bend 110 between the step portion 106 and the first end 108. Similarly, a second end 112 is opposed the first end 108, with a bend 114 between the step portion 106 and the second end 112. The first end 108 and second end 112 are both oriented in the same direction and will generally provide the mounting locations to connect the running step 102 to a vehicle chassis.

Figure 2:
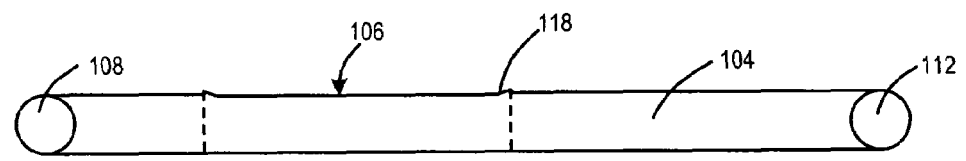
FIG. 2 is a side view of an embodiment of a vehicle running step.
Figure 4:
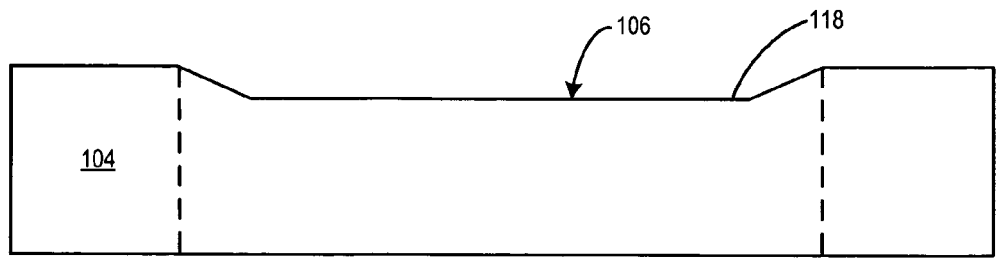
FIG. 4 is a partial side view of the step portion of an embodiment of a vehicle running step.

At a least one position along the linear tube 104, an insert opening 116 is formed by cutting away the upper surface of the tube 104 and the lower surface of the tube 104 to form an opening vertically through the entire tube structure. The edges of the opening in the upper portion of the tube 104 and the edges of the opening in the lower portion of the tube 104 are generally in vertical alignment. As shown in FIGS. 2 and 4, in the preferred embodiment, the tube 104 is provided with a substantially flattened section 118 along the upper most surface adjacent the insert opening 116. The flattened section 118 to provides a generally flat area for foot placement are which is more stable than the typical round surface of the tube 104, to increase safety when the running step 102 is used.

Figure 3:
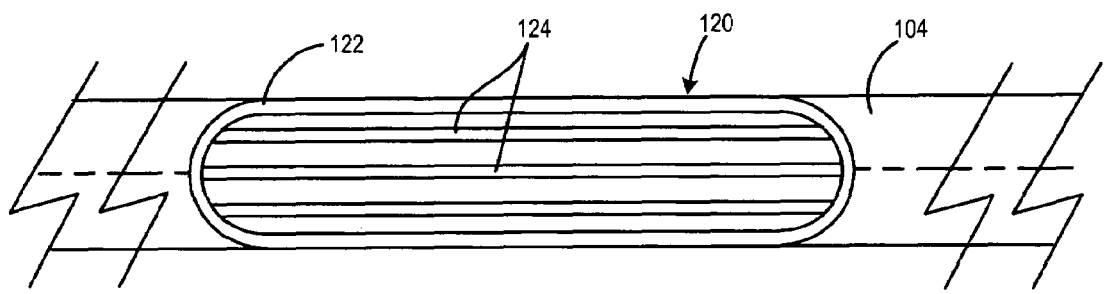
FIG. 3 is a partial view of the step portion of an embodiment of a vehicle running step.
Figure 5:
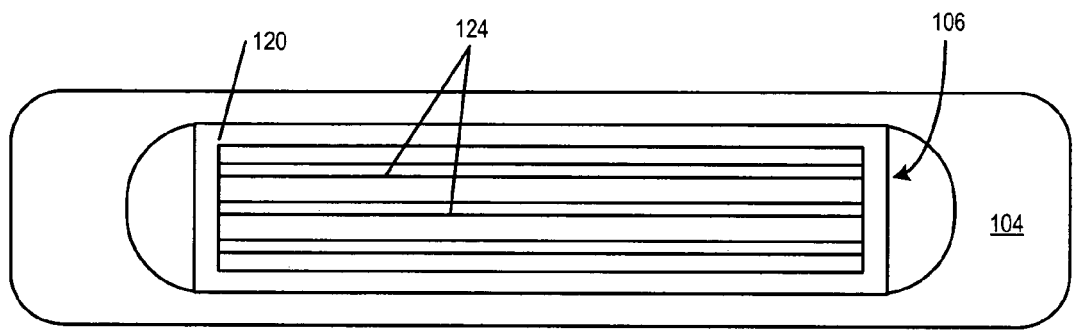
FIG. 5 is a partial view of the tread insert of an embodiment of a vehicle running step.
Figure 10:
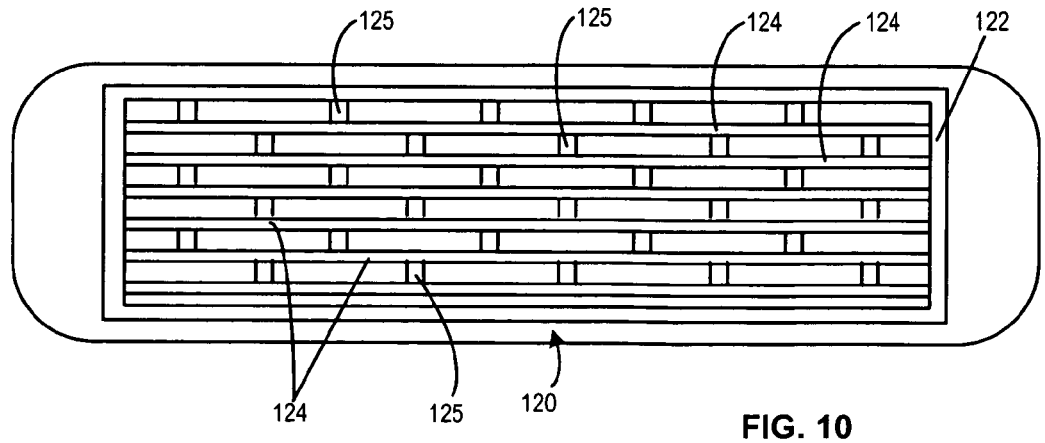
FIG. 10 is a partial view of the tread insert of another embodiment of a vehicle running step.

A tread insert 120, as best shown in FIGS. 3, 5 and 10 is formed separately from the tube 104 and is preferably manufactured from steel, aluminum or other rigid material. The insert includes a bracket 122, preferably formed of rigid plate material and is substantially dimensioned to mate to the insert opening 116 of the tube 104. The bracket 122 will generally be fastened to the tube 104 by weldment or similar attachment means. A plurality of tread plates 124 are positioned within the bracket 122 and fixed in vertical spaced apart alignment as shown. The spaced apart tread plates 124 are preferably aligned and positioned parallel to the length of the tube 104 and consequently parallel to the vehicle itself. It is understood, however, the tread plates 124 can be spaced apart and aligned in any orientation within the scope and spirit of this invention. The space between the tread plates 124 is sufficient to allow debris to fall between the plates onto the ground but are close enough together to prevent a user's foot from wedging between the plates 124 during use. Generally, as shown in FIG. 10, retention bars 125 will be positioned between each adjacent pair of tread plates 124 to increase rigidity of the tread plates 124 and to limit flex or bend of the plates 124 during use. The retention bars 125 also prevent a user's foot from wedging between adjacent plates 124.

In the preferred embodiment, the upper surface 126 of each spaced apart tread plate 124 is substantially flush with the upper surface of the tube 104. Each tread plate 124 may span from the top of the tube structure to the bottom of the tube structure. It is understood, however, that the tread plates 124 may be manufactured to span less than the entire diameter of the tube 104.

Figure 6:
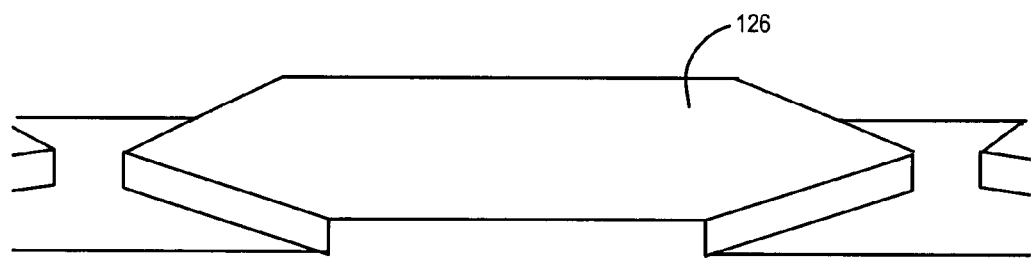
FIG. 6 is a close up partial view of the upper surface of a tread plate of an embodiment of a vehicle running step.

Each tread plate 124 has an upper surface 126 which is preferably flush to the tube 104 surface, and which is patterned to increase friction. For example, as shown in FIG. 6 each surface 126 may have small cut out portions, or metal build up to increase the surface friction of the surface 126. While the preferred embodiment is configured such that the upper surface 126 of the tread plate 124 is substantially flush with the outer periphery of the tube 104, the upper surface may also be recessed below or positioned above the periphery of the tube 104.

Figure 9:
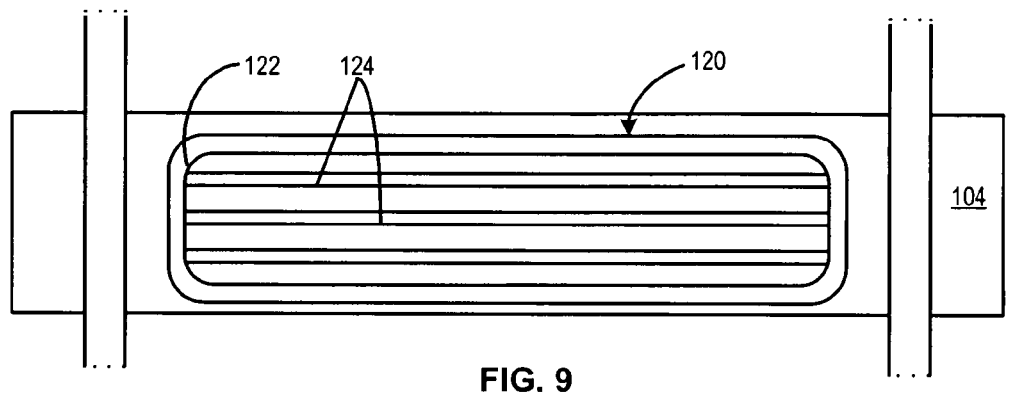
FIG. 9 is a partial top view of another embodiment of a vehicle running step.

Any variety of tube lengths can be used to configure the specific tube applications to the vehicle to which it is intended to be attached. Consequently, the length of the tread insert 120 may be varied depending on the overall tube length. In a second embodiment of the invention, the tread insert 120 spans substantially the entire length of the tube 104 as shown in FIG. 9. The tread plates 124 also span the length of the tube 104 within the dimensions of the tread insert 120.

Figure 7:
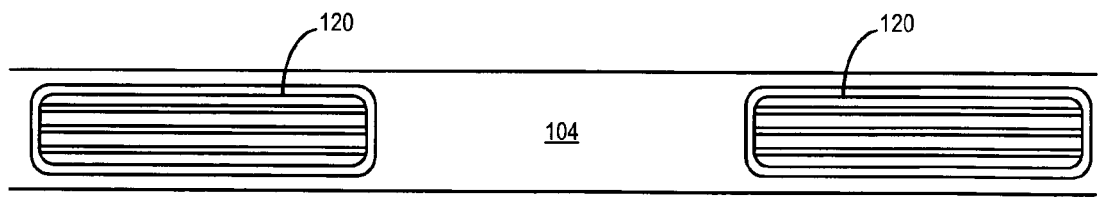
FIG. 7 is a partial top view of another embodiment of a vehicle running step.
Figure 8:
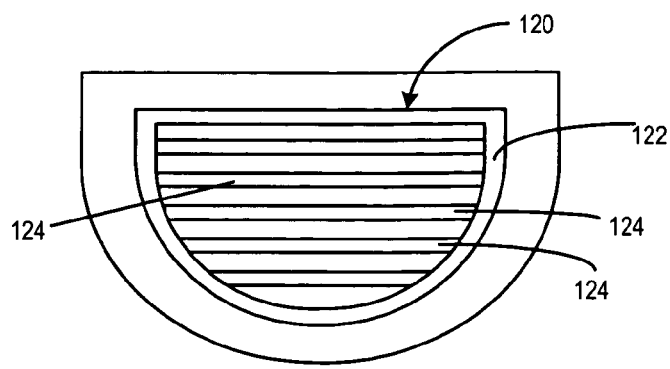
FIG. 8 is a partial top view of the tread insert of another embodiment of a vehicle running step.

Moreover, the insert opening 116 and step insert 122 may be manufactured in any variety of geometric shapes and configurations, such as squares, rectangles, ovals, circles, diamonds or other similar shapes, an example is shown in FIG. 8. Each tube 104 may be provided with multiple insert openings 116 and step inserts 120 as shown in FIG. 7. This configuration allows for multiple tread inserts to be positioned along the tube, beneficial on applications such as on four door vehicles where it is preferred to have a tread insert 120 substantially adjacent each vehicle door.

While the present invention has been described above, it should be clear that many changes and modifications may be made to the process and product without departing from the spirit and scope of this invention.

Figure 11:
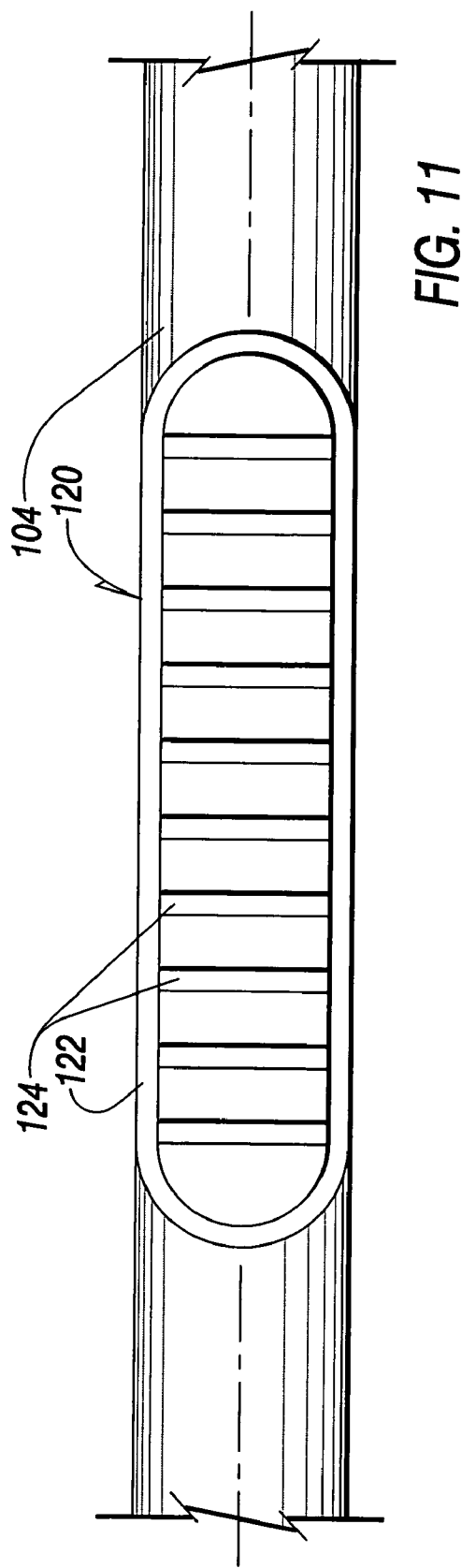
FIG. 11 is a partial view of the step portion of an embodiment of a vehicle running step.

Referring to FIG. 11, a partial view of the step portion of an embodiment of a vehicle running step is shown. In the embodiment shown, the tread plates 124 in tread insert 120 are disposed substantially perpendicular to the length of the tube 104.

What is claimed is:

1. An automotive running step constructed of rigid tubular material and adapted to be secured to an automotive vehicle, the running step comprising an elongated tube for attachment to a vehicle chassis, a tread insert opening disposed along the length of the tube, said tread insert opening further comprising a vertically aligned opening through the upper and lower surfaces of the tube; a tread insert mounted within the tread insert opening further comprising a plurality of spaced apart vertically aligned tread plates.

2. The automotive running step of claim 1 wherein the plurality of tread plates are oriented generally parallel the length of the tube.

3. The vehicle running step of claim 2 wherein the tread insert opening and the tread insert span at least fifty percent of the overall length of the tube member.

4. The vehicle running step of claim 1 wherein the plurality of tread plates are oriented generally perpendicular the length of the tube.

5. The vehicle running step of claim 1 further comprising a plurality of tread insert openings each fitted with a tread insert spaced along the tube length.

6. The vehicle running step of claim 1 further comprising at least one retention bar mounted between each adjacent pair of the plurality of tread plates.

7. The running step of claim 1 wherein the surface of each tread plate is patterned to increase friction.

8. The running step of claim 1 wherein the tube is substantially flattened proximate the tread insert opening.

9. The running step of claim 1 wherein an opening exists between each pair of adjacent tread plates.

10. An automobile running step comprising an elongate tube having a length, a substantially flattened portion positioned along the tube length, a tread insert opening through the upper and lower surfaces of the substantially flattened portion and a plurality of vertically aligned, spaced apart tread plates fixed within the opening such that a surface of each tread plate is substantially flush with the tube.

11. The running step of claim 10 wherein the surface of each tread plate is patterned to increase friction.

12. The running step of claim 10 wherein an opening exists between each pair of adjacent tread plates.

* * * * *